3,776,936
THIOCARBAMIC ACID ESTER PESTICIDES
Gopal H. Singhal, Westfield, and Robert E. Turkos, Fords, N.J., assignors to Esso Research and Engineering Company
No Drawing. Filed May 19, 1970, Ser. No. 38,896
Int. Cl. C07c 155/08
U.S. Cl. 260—455 A
9 Claims

ABSTRACT OF THE DISCLOSURE

Thiocarbamic acid esters characterized by the following structural formula:

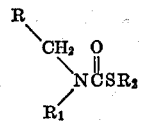

wherein R is a cycloalkyl group containing from 3 to 5 carbon atoms, said group being optionally substituted by $C_1$–$C_4$ alkyl groups; $R_1$ can be same as R or it can also be a $C_1$–$C_4$ alkyl group optionally substituted by a $C_1$–$C_4$ alkoxy, $C_1$–$C_4$ alkylthio, cyano or a carbethoxy group; $R_2$ is a $C_1$–$C_6$ alkyl group. Compounds having these structures possess excellent pre-emergent herbicidal activity along with excellent crop tolerance. In addition, these compounds possess good fungicidal activity.

---

This invention relates to certain novel compositions of matter and their use as herbicides. In one aspect, this invention relates to the use of certain N-cycloalkylalkyl thiocarbamates as herbicides, which in addition, show excellent crop tolerance. In another aspect, this invention relates to the use of certain thiocarbamates as fungicides.

The prior art is filled with a plethora of literature disclosing the fact that thiocarbamates are useful as herbicides. In particular, a U.S. Pat. No. 3,175,897 issued on Mar. 30, 1965 and assigned to Stauffer Chemical Company, discloses asymmetric thiocarbamates characterized by the following structural formula:

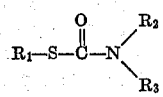

wherein $R_1$ is selected from ethyl and n-propyl radicals, $R_2$ is an ethyl radical and $R_3$ is selected from n-butyl and cyclohexyl radicals.

This patent stated that such compounds having asymmetric substituents on the nitrogen atoms, have a much higher safety factor on certain important crops than do the corresponding symmetric compounds which were disclosed in U.S. Pat. 2,913,327.

Another pertinent patent is the English Patent, 1,010,-741 assigned to Monsanto Company which describes certain thiocarbamic acid esters. This patent describes those thiocarbamic esters characterized by the following structural formula:

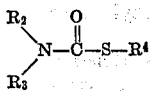

in which $R_2$ and $R_3$ are alkyl, cycloalkyl, alkoxyalkyl, aryl, aryloxyalkyl, aralkyl, aralkoxalkyl, cyanoalkyl, alkenyl, haloalkenyl, cycloalkenyl, furfuryl, or tetrahydrofurfuryl groups or $R_2$ and $R_3$ together represent a polymethylene group which may be interrupted by an oxygen or nitrogen atom, not more than one of $R_2$ and $R_3$ being a cycloalkyl, aryl, alkoxyalkyl, aryloxyalkyl, furfuryl, or tetrahydrofurfuryl group and $R_4$ is a trihaloalkenyl group.

These compounds have also been described as possessing excellent herbicidal activity.

An object of this invention is to introduce new thiocarbamate structures which not only possess excellent herbicidal activity, but also indicate a very high degree of crop tolerance. Unexpectedly some of these compounds possess good fungicidal activity.

The novel thiocarbamates of the subject invention can be characterized by the following structural formula:

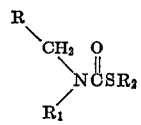

wherein R is a cycloalkyl group containing from 3 to 5 carbon atoms, said group being optionally substituted by $C_1$–$C_4$ alkyl groups; $R_1$ can be the same as R or it can also be a $C_1$–$C_4$ alkyl group optionally substituted by a $C_1$–$C_4$ alkoxy, $C_1$–$C_4$ alkylthio, cyano or a carbethoxy group; $R_2$ is a $C_1$–$C_6$ alkyl group.

It is noted that the novelty in these compounds resides in the fact that the cycloalkyl group is not bonded directly to a nitrogen atom but rather through a methylene group. The criticality of the cycloalkyl group will be demonstrated in another portion of the application. If, as taught in the British patent, a heterocyclic moiety is substituted for the cycloalkyl group, the subject compounds are devoid of herbicidal activity. The British Monsanto patent definitely states that the group $R_2$ is a trihaloalkenyl group and therefore, the criticality in the makeup of the cyclic constituent may not be as important as is in the subject invention, because in this invention, $R_2$ is definitely limited to an alkyl group.

In adidtion, the Stauffer U.S. patent does not show the importance of placing a methylene group between the cycloalkyl group and the nitrogen atom and discloses that the cyclohexyl group is directly attached to the nitrogen atom of the thiocarbamoyl group.

The lower cycloalkyl compounds represent completely different chemical techniques than do the cyclohexyl compounds. Cyclohexyl compounds can be easily prepared.

The literature is abundant in the description of synthesis of cyclohexylamines. The equations below summarize some actual commercial applications which utilize inexpensive raw materials.

For example, the well known nitration of coal tar products gives nitrobenzenes which are readily reduced to anilines via such reagents as stannous chloride, iron and water, iron and acid, tin and acid, etc., as well as hydrogenation over palladium on carbon, platinum on carbon, etc. (See Rylander, P. N., "Catalytic Hydrogenation Over Platinum Metals," p. 171, Academic Press, 1967; Sandler, S. R., and Karo, W., "Organic Functional Group Preparations," p. 339–40, Academic Press, 1968).

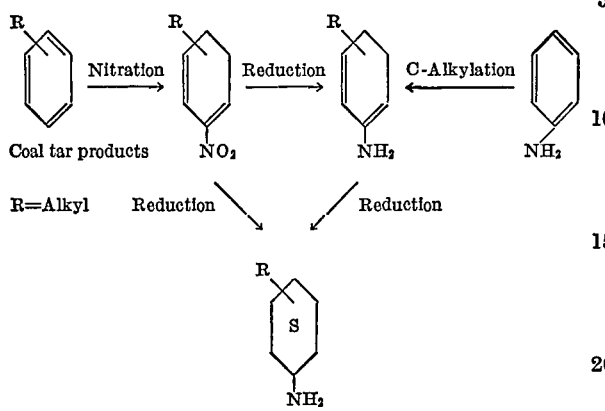

Coal tar products

R=Alkyl

An alternate pathway to substituted anilines is via C-Alyklation of aniline itself [Ecke, Napolitano, and Kolka; J. Org. Chem. 21, 711 (1956); Kolka, Ecke, and Closson; U.S. 2,814,646 (1957); Hofmann; Ber. 5, 720 (1872); Reilly and Hickinbottom; J. Chem. Soc. 117, 103, (1920)].

The substituted anilines are then catalytically reduced to the required cyclohexylamines mentioned in Examples 4 and 6 of the Wilder patent. [See for example Skita and Berendt; Ber. 52, 1525 (1919): I. G. Farbenindustrie Akt.-Ges., Ger. 481,984 (1929); Imperial Chemical Industries, Ltd., Brit. 630,859 (1949)].

Alternatively, substituted nitrobenzenes may undergo simultaneous hydrogenation of the nitro group and ring saturation to form the desired cyclohexylamines. These cyclohexylamines then readily react with alkyl chlorothioformate to form products such as are listed in the Stauffer patent.

In summary then the wide availability of cyclohexylamines is primarily due to the abundance of benzene derivatives from which the saturated systems are obtained.

By contrast, the lower cycloalkyl structures are not nearly as readily available and although many novel and ingenious methods have been devised for preparation of these lower cycloalkyl derivatives, none as yet approaches commercial importance at least in the same scope that cyclohexyl derivatives have become commercial.

As a case in point, due to the special strain properties of the cyclopropyl ring which make it somewhat akin to an unsaturated olefin in reactivity, carefully chosen reaction conditions must be used in the preparation of such ring systems. Cyclopropane and many of its derivatives react readily with such electrophilic reagents as halogens, hydrogen halides, sulfuric acid, aluminum chloride, etc., causing rupture of the ring. It is probable that the unusual properties of the cyclopropyl ring in contrast for example with the cyclohexyl ring, are responsible for the increase in literature reports of physiologically active cyclopropane ring containing monamine oxidase inhibitors, antidepressants, tranquilizers, and selatives in related pharmaceutical fields. [See Brit. 861,783, Abbott Laboratories; U.S. 3,225,096, Eli Lilly & Co.; U.S. 3,235,-597, Eli Lilly & Co., Belg. 625,100, Abbott Laboratories; U.S. 3,155,725, Smith, Kline and French Labs; Ger. 1,124,485, Farbwerke Hoechst A.G.; Belg. 649,145, Neisler Labs.]

A few examples of preparation of lower cycloalkyl ring systems are given here. In most cases the introduction of amino functions in these systems is done via transformation of another functional group under conditions that will sustain the cycloalkyl ring.

(a)

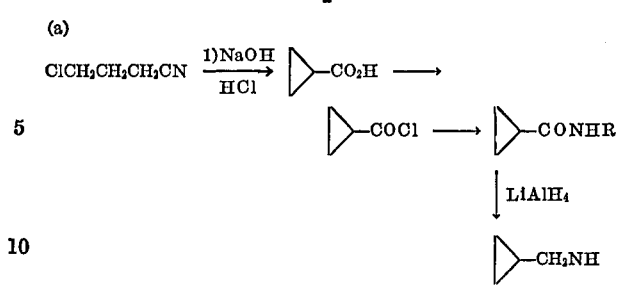

The last step in this sequence is surprising in that LiAlH$_4$ causes ring opening in closely related systems, e.g.:

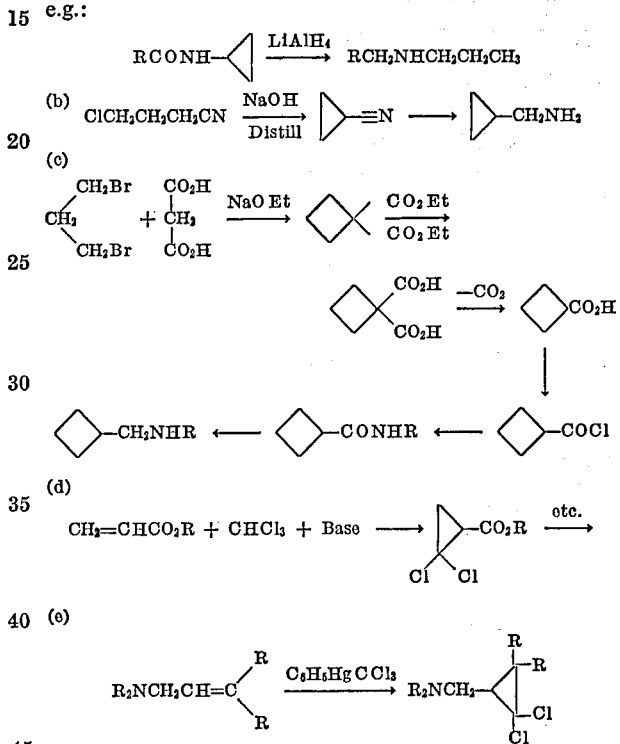

In summary it would appear clear that substantial differences exist between the well established cyclohexyl systems and the lower cycloalkyl counterparts.

Exemplary of thiocarbamates having the structure which is encompassed by this invention are the following:

| Compound Number | |
|---|---|
| 1 | S-ethyl N-cyclopropylmethyl-N-propylthiocarbamate. |
| 2 | S-ethyl N-β-cyanoethyl-N-propylthiocarbamate. |
| 3 | S-ethyl N-n-butyl-N-cyclopropylmethylthiocarbamate. |
| 4 | S-ethyl N-i-butyl-N-cyclopropylmethylthiocarbamate. |
| 5 | S-ethyl N-cyclopropylmethyl-N-3-methylmercaptopropylthiocarbamate. |
| 6 | S-ethyl N-cyclopentylmethyl-N-ethylthiocarbamate. |
| 7 | S-propyl N-1-methylcyclopropylmethyl-N-propylthiocarbamate. |
| 8 | S-propyl N-cyclopropylmethyl-N-propylthiocarbamate. |
| 9 | S-ethyl N-ethyl-N-1-methylcyclopropylmethylthiocarbamate. |
| 10 | S-isoamyl N-3-cyanobutyl-N-3-methylcyclopentylmethylthiocarbamate. |
| 11 | S-propyl N-cyclopropyl-N-cyclopropylmethylthiocarbamate. |
| 12 | S-butyl N-1-carbethoxy-2-methylpropyl-N-3-methylcyclobutylmethylthiocarbamate. |
| 13 | S-methyl N-1-methylcyclobutylmethyl-N-methylmercaptomethylthiocarbamate. |
| 14 | S-hexyl N-cyclobutylmethyl-N-ethoxymethylthiocarbamate. |
| 15 | S-ethyl N-2-t-butoxyethyl-N-2-ethylcyclopropylmethylthiocarbamate. |
| 16 | S-isobutyl N-1-methylcyclopropylmethyl-N-propylthiocarbamate. |
| 17 | S-isobutyl N-cyclopropylmethyl-N-propylthiocarbamate. |
| 18 | S-butyl N-cyclopropylmethyl-N-propylthiocarbamate. |
| 19 | S-propyl N-cyclobutyl-N-cyclopropylmethylthiocarbamate. |
| 20 | S-amyl N-cyclopropylmethyl-N-propylthiocarbamate. |

The method for forming the compounds of this invention can be schematically represented as follows:

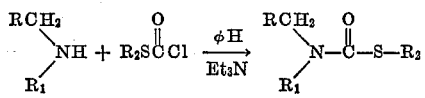

This reaction is carried out at a temperature ranging from 25 to 110° C., preferably from 35–80° C., under atmospheric pressure. The mole ratio of the secondary amine to the chlorothioformate is 1:1. The reaction is carried out in the presence of a solvent. The solvent can be a $C_5$–$C_8$ hydrocarbon such as benzene, toluene, xylene, etc., ketones, ethers, such as diethyl ether, tetrahydrofuran, dioxane, esters such as ethylacetate and methylacetate. The preferred solvents are benzene, tetrahydrofuran and ethyl acetate.

The acid acceptor, such as triethylamine, is used in 10% molar excess through molar equivalent or large excess of the tertiary amine works equally well. Other acid acceptors such as trimethylamine, pyridine, sodium or potassium carbonate can also be used.

The method of synthesis of the starting secondary amines are covered in a copending application bearing Ser. No. 749,326, having been filed Aug. 1, 1968 and now U.S. Pat. 3,546,295.

The alkyl chlorothioformates are prepared by the method described by Tilles [J. Am. Chem. Soc. 81, 714 (1959)] and form no part of this invention.

The compounds of the invention have general herbicidal and fungicidal properties. They are especially useful in certain types of weed or fungus control, such as, for example, in application to crop lands to give control of the common weeds or fungi, without harming the crop plants; and for the control of crabgrass in lawns.

Herbicidal and fungicidal compositions of the invention are prepared by admixing one or more of the active ingredients defined heretofore, in herbicidally or fungicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus, the herbicidal or fungicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high, up to about 50% by weight or more concentration of the active ingredient can be obtained in solution.

The herbicidal or fungicidal compositions of the invention, whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal or fungicidal compositions are applied either as a spray, granular or a dust to the locus or area to be protected from undesirable plant growth, commonly called weeds, i.e., plants growing where they are not wanted, or for the control of fungi. Such application can be made directly upon the locus or area and the weeds thereon during the period of weed or fungus infestation in order to destroy the weeds or pathogens, but preferably, the application is made in advance of an anticipated weed or fungus infestation to prevent such infestation. Thus, the compositions can be applied as aqueous foliar sprays in case of herbicidal application, but can also be applied as sprays directly to the surface of the soil. Alternatively, the dry powdered compositions can be dusted directly on the plants for use as herbicides, or on the soil for both the applications.

In applying the herbicidal or fungicidal compositions of the invention for selective weed control as in the control of weeds or fungus control in cotton or corn fields, the compositions are preferably applied after planting of the crop seeds but before emergence of the seedlings. In other words, the applications are of the pre-emergence type.

The active compound is, of course, applied in an amount sufficient to exert the desired herbicidal or fungicidal action. The amount of the active compound present in the compositions as actually applied for destroying or preventing weeds or fungi will vary with the manner of application, the particular weeds or fungi for which control is sought, the purpose for which the application is being made, and like variables. In general, the herbicidal or fungicidal compositions as applied in the form of a spray, dust or granular, will contain from about 0.1% to 100% by weight of the active compound.

Fertilizer materials, other herbicidal or fungicidal agents, and other pest control agents such as insecticides can be included in the herbicidal or fungicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably as activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present thiocarbamic acid ester compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending properties as distinct from wetting properties, although these substances can also possess wetting properties as well.

The dispersant or dispersing agent used can be protective collodis such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids, derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide, or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvent should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

The following examples illustrate the synthesis of compounds of the invention:

EXAMPLE 1

Preparation of S-ethyl N-cyclopropylmethyl-N-propylthiocarbamate

To a stirring solution of 11.3 g. (0.1 mole) cyclopropylmethyl propylamine and 11 g. (0.11 mole) triethylamine in 250 ml. of benzene was added dropwise a solution of 12.6 g. (0.1 mole) ethyl chlorothioformate in 75 ml. of benzene. The reaction was exothermic and the temperature was maintained below 35° C. After complete addition and stirring for one half hour, the mixture was heated at reflux for one hour, cooled, and filtered. The filtrate was washed twice with water, dried ($Na_2SO_4$), stripped of solvent, and distilled under vacuum. Distillation yielded 14.7 g. of a colorless liquid $b_{0.3\ mm.}$ 70° C.

Analysis: Calculated for $C_{10}H_{19}NOS$: N, 6.98%. Found: N, 7.53%.

The structure of this example and those of the following examples were also confirmed by infrared and/or NMR.

EXAMPLE 2

Preparation of S-ethyl N-n-butyl-N-cyclopropylmethyl thiocarbamate

To a stirring solution of 9.0 g. (.07 mole) cyclopropylmethylbutylamine and 8 g. (.079 mole) triethylamine in 150 ml. of benzene was added dropwise 9.0 g. (.07 mole) ethyl chlorothioformate in 70 ml. of benzene. After complete addition and heating at reflux for two and one half hours the workup as described above was done. Vacuum distillation yielded 12 g. of a colorless liquid $b_{.4-.5\ mm.}$ 109–111° C.

Analysis: Calculated for $C_{11}H_{21}NOS$: N, 6.51%. Found: N, 6.89%.

EXAMPLE 3

Preparation of S-ethyl N-i-butyl-N-cyclopropylmethylthiocarbamate

This compound was prepared according to the procedure outlined in Example 1. Distillation yielded a colorless liquid $b_{0.1-.2\ mm.}$ 85–95° C.

Analysis: Calculated (percent): C, 60.47; H, 9.77; N, 6.51. Found (percent): C, 62.40; H, 10.20; N, 6.48.

EXAMPLE 4

Preparation of S-ethyl N-cyclopropylmethyl-N-3-methylmercaptopropylthiocarbamate This compound was prepared according to the procedure outlined in Example 1. Distillation yielded a colorless liquid $b_{0.1-.2\ mm.}$ 120° C.

Analysis: Calculated (percent): C, 53.45; H, 8.50; N, 5.67. Found (percent): C, 54.22; H, 8.76; N, 6.78.

EXAMPLE 5

Preparation of S-ethyl N-cyclopentylmethyl-N-ethylthiocarbamate

This compound was prepared according to the procedure outlined in Example 1. Distillation yielded a colorless liquid $b_{0.1\ mm.}$ 85–9° C.

Analysis: Calculated (percent): C, 61.47; H, 9.77; N, 6.51. Found (percent): C, 61.99; H, 9.79; N, 7.05.

EXAMPLE 6

Preparation of S-ethyl N-ethyl-N-tetrahydrofurfurylthiocarbamate

This compound was prepared according to the procedure outlined in Example 1. Distillation yielded a colorless liquid $b_{0.1\ mm.}$ 93–6° C.

Analysis: Calculated (percent): C, 52.67; H, 9.27; N, 6.83. Found (percent): C, 55.81; H, 8.87; N, 6.86.

EXAMPLE 7

Preparation of S-propyl N-1-methylcyclopropylmethyl-N-propylthiocarbamate

This compound was prepared according to the procedure outlined in Example 1. Distillation yielded a colorless liquid $b_{2.3-2.5\ mm.}$ 85–110° C.

Analysis: Calculated (percent): C, 62.83; H, 10.11; N, 6.11. Found (percent): C, 59.38; H, 9.85; N, 7.66.

EXAMPLE 8

Preparation of S-propyl N-cyclopropylmethyl-N-propylthiocarbamate

This compound was prepared according to the procedure outlined in Example 1. Distillation yielded a colorless liquid $b_{1.5\ mm.}$ 103° C.

Analysis: Calculated (percent): C, 61.35; H, 9.83; N, 6.50. Found (percent): C, 61.81; H, 9.62; N, 6.40.

EXAMPLE 9

Preparation of S-propyl N-propyl-N-tetrahydrofurfurythiocarbamate

This compound was prepared according to the procedure outlined in Example 1. Distillation yielded a colorless liquid $b_{1.5\ mm.}$ 128–9° C.

Analysis. Calculated (percent): C, 58.74; H, 9.45; N, 5.71. Found (percent): C, 59.17; H, 9.11; N, 5.74.

EXAMPLE 10

Preparation of S-ethyl N-ethyl-N-1-methylcyclopropylmethylthiocarbamate

This compound was prepared according to the procedure outlined in Example 1. Distillation yielded a colorless liquid $b_{1.4\ mm.}$ 84° C.

Analysis: Calculated (percent): C, 59.66; H, 9.51; N, 6.96. Found (percent): C, 59.93; H, 9.16; N, 6.52.

EXAMPLE 11

Preparation of S-ethyl N-propyl-N-tetrahydrofurfurylthiocarbamate

This compound was prepared according to the procedure outlined in Example 1. Distillation yielded a colorless liquid $b_{0.05\ mm.}$ 80–100° C.

Analysis: Calculated (percent): C, 57.15; H, 9.09; N, 5.92. Found (percent): C, 57.53; H, 9.49; N, 5.50.

EXAMPLE 12

Representative thiocarbamate compounds of the subject invention prepared in the previous examples were evaluated for pre-emergence herbicidal activity in this example. The test procedure employed was as follows:

Two flats seeded with six crops (cotton, soybean, alfala, corn, rice and oats) and six weeds (mustard, morning glory, cragbrass, foxtail, barnyard grass and zinnia) were sprayed with a formulation containing the test chemical at the rate given in Table I. The test chemicals were sprayed as acetone solutions or very small particle acetone suspensions onto the test plants. Sprayers were calibrated to deliver a certain volume of liquid and the calculated amount of active ingredient which would give a rate corresponding to the indicated lbs./acre. The flats were then held in the greenhouse and a response rated after 12 days to 16 days. Response was rated by a scale of 0–10. The 0–10 scale is defined as: 0=no injury; 1–3=slight injury; 4–6=moderate injury, plants may die; 7–9=severe injury, plants will probably die; 10=all plants dead (complete kill).

Below in Table I is illustrated the result of testing two compounds on selected weeds and crops. The first compound, a N-cycloalkylalkylthiocarbamate, is active against grassy weeds and safe on crops. In the second instance, the insertion of a heteroatom into the cyclic system produces an inactive compound.

In Table II below are shown comparison tests of several N-cycloalkylalkylthiocarbamates versus Eptam (S-ethyl N-propyl-N-ethylthiocarbamate) on grassy and broadleaf weeds. Note that the compounds were tested by being pre-plant incorporated rather than by pre-emergence techique. The activity of the compounds of the subject invention with certain exceptions is excellent on the grassy weeds. In addition, these N-cycloalkylalkyl thiocarbamates have a broader spectrum of activity than the commercial compound. Control of broadleaf weeds is good to excellent in most cases.

The following procedure was used on compounds tested by being pre-plant incorporated:

Soil was mixed in a V-blender with a formulation containing the test chemical at the rate given in Table II. The soil was placed in flats and seeded with six weeds (mustard), morning glory, zinnia, crabgrass, barnyard grass, and foxtail). The flats were held in the greenhouse and a response rated after 12 to 16 days on a scale of 0–10. This scale was defined above.

EXAMPLE 13

Representative thiocarbamate compounds of the subject invention prepared in the previous examples were evaluated for soil fungicidal activity. The test procedure employed was as follows:

Lots of sterilized soil are inoculated with *Sclerotium rolfsii*. The inoculated soil is placed in 4-ounce Dixie cups. Two cups containing the organism are drenched with 30 ml. of a formulation containing sufficient chemical to give dosage rate of 100 lbs./a. The treated cups are incubated for two days at 70° F. The amount of mycelial growth on the soil surface is then rated. A rate of 10 indicates complete control while rate of 0 means no control. Activity against *Sclerotium rolfsii* of selected compounds at 100 lbs./a.:

| Compound: | Rating |
|---|---|
| S - Ethyl N - butyl - N - cyclopropylmethylthiocarbamate | 10 |
| S - Ethyl N - i - butyl - N - cyclopropylmethylthiocarbamate | 10 |
| S - Ethyl N - cyclopentylmethyl N - ethyl thiocarbamate | 10 |
| S - Ethyl N - ethyl - N - tetrahydrofurfuryl thiocarbamate | 8 |
| S - Ethyl N - cyclopropylmethyl - N - propyl thiocarbamate | 10 |
| S - Ethyl N - propyl - N - tetrahydrofurfuryl thiocarbamate | 9 |

TABLE I.—PRE-EMERGENCE HERBICIDAL ACTIVITY OF SELECTED COMPOUNDS

| Name of compound | Rate, lb./a. | Barn-yard grass | Crab-grass | Fox-tail | Zin-nia | Mus-tard | Morn-ing glory | Cot-ton | Soy-bean | Al-falfa | Corn | Oats |
|---|---|---|---|---|---|---|---|---|---|---|---|---|
| S-ethyl N-cyclopropylmethyl-N-propylthiocarbamate | 10 | 9 | 9 | 9 | 3 | 2 | 3 | 2 | 3 | 0 | 0 | 10 |
| S-ethyl N-propyl-N-tetrahydrofurfurylthiocarbamate | 10 | 0 | 1 | 1 | 0 | 0 | 0 | 0 | 0 | 0 | 0 | 0 |
| S-ethyl N-butyl-N-cyclopropylmethylthiocarbamate | 4 | 4 | 7 | 7 | 1 | 0 | 1 | | | | | |
| S-propyl N-cyclopropylmethyl-N-propylthiocarbamate | 4 | 9 | 9 | 9 | 3 | 3 | 3 | | | | | |
| S-ethyl N,N-dipropylthiocarbamate (Eptam)[1] | 4 | 6 | 5 | 7 | 0 | 1 | 0 | | | | | |

[1] Known commercial compound.

TABLE II.—PRE-EMERGENT HERBICIDAL ACTIVITY (Pre-Plant Incorporated)

| Name of compound | Rate, lb./a. | Barnyard grass | Crabgrass | Foxtail | Zinnia | Mustard | Morning glory |
|---|---|---|---|---|---|---|---|
| S-ethyl N-n-butyl-N-cyclopropylmethylthiocarbamate | 4 | 7 | 9 | 10 | 1 | 1 | 3 |
|  | 2 | 6 | 9 | 10 | 1 | 0 | 1 |
| S-ethyl N-i-butyl-N-cyclopropylmethylthiocarbamate | 4 | 7 | 9 | 10 | 8 | 10 | 9 |
|  | 2 | 6 | 9 | 10 | 2 | 1 | 4 |
| S-ethyl N-cyclopropylmethyl-N-3-methylmercaptopropylthiocarbamate | 4 | 0 | 1 | 2 | 10 | 8 | 1 |
|  | 2 | 0 | 0 | 2 | 8 | 8 | 0 |
| S-ethyl N-cyclopentylmethyl-N-ethylthiocarbamate | 4 | 7 | 9 | 10 | 10 | 9 | 1 |
|  | 2 | 6 | 5 | 9 | 4 | 5 | 0 |
| S-propyl N-1-methylcyclopropylmethyl-N-propylthiocarbamate | 4 | 8 | 9 | 9 | 5 | 10 | 6 |
|  | 2 | 6 | 9 | 8 | 3 | 1 | 3 |
| S-propyl N-cyclopropylmethyl-N-propylthiocarbamate | 4 | 9 | 9 | 9 | 5 | 10 | 7 |
|  | 2 | 7 | 6 | 9 | 9 | 8 | 4 |
| S-ethyl N-ethyl-N-1-methylcyclopropylmethylthiocarbamate | 4 | 9 | 9 | 10 | 9 | 10 | 7 |
|  | 2 | 9 | 8 | 10 | 8 | 7 | 3 |
| Eptam | 4 | 9 | 9 | 10 | 2 | 2 | 4 |
|  | 2 | 7 | 8 | 9 | 1 | 4 | 2 |

What is claimed is:

1. A compound characterized by the following structural formula:

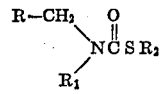

wherein R is a cycloalkyl group containing from 3 to 5 carbon atoms, said group being optionally substituted by $C_1$–$C_4$ alkyl groups; $R_1$ is a $C_1$–$C_4$ alkyl group optionally substituted by a methylthio group; $R_2$ is a $C_1$–$C_6$ alkyl group.

2. A compound according to claim 1, S-ethyl-N-cyclopropylmethyl-N-propylthiocarbamate.

3. A compound according to claim 1, S-ethyl N-n-butyl-N-cyclopropylmethylthiocarbamate.

4. A compound according to claim 1, S-ethyl N-i-butyl-N-cyclopropylmethylthiocarbamate.

5. A compound according to claim 1, S-ethyl N-cyclopropylmethyl-N-3-methylmercaptopropylthiocarbamate.

6. A compound according to claim 1, S-ethyl N-cyclopentylmethyl-N-ethylthiocarbamate.

7. A compound according to claim 1, S-propyl N-1-methylcyclopropylmethyl-N-propylthiocarbamate.

8. A compound according to claim 1, S-propyl N-cyclopropylmethyl-N-propylthiocarbamate.

9. A compound according to claim 1, S-ethyl N-ethyl-N-1-methylcyclopropylmethylthiocarbamate.

References Cited

UNITED STATES PATENTS

| | | | |
|---|---|---|---|
| 3,151,119 | 9/1964 | Grisley et al. | 260—455 A |
| 3,510,503 | 5/1970 | Brokke et al. | 71—100 |
| 3,404,975 | 10/1968 | Wilson et al. | 71—100 |
| 2,983,747 | 5/1961 | Campbell et al. | 260—455 A |
| 3,290,351 | 12/1966 | McKay et al. | 260—455 A |
| 3,352,662 | 11/1967 | Klopping et al. | 71—100 |
| 3,451,802 | 6/1969 | Neighbors et al. | 71—93 |
| 3,546,295 | 12/1970 | Maravetz | 71—88 |

FOREIGN PATENTS

| | | | |
|---|---|---|---|
| 862,250 | 3/1961 | Great Britain | 260—455 A |

GLENNON H. HOLLRAH, Primary Examiner

U.S. Cl. X.R.

260—347.2; 71—88, 100, DIG. 1; 424—285, 300